April 6, 1948. I. K. BENNETT 2,439,283
BROILER GRILL
Filed April 9, 1945

INVENTOR
IRVING K. BENNETT
BY
ATTORNEY

Patented Apr. 6, 1948

2,439,283

UNITED STATES PATENT OFFICE 2,439,283

BROILER GRILL

Irving K. Bennett, Baldwin, N. Y.

Application April 9, 1945, Serial No. 587,348

1 Claim. (Cl. 99—450)

The invention here disclosed relates to grills for broiling foodstuffs.

Objects of the invention are to provide a grill which while affording necessary support to the material under treatment, will provide for a maximum circulation of heat; which will be light in weight but rugged and strong in construction and which will be easy to keep in clean, sanitary condition.

Other objects of the invention are to provide a grill of the character indicated which can be produced and sold at low cost and will be generally useful for all broiling purposes.

Other desirable objects and the novel features by which the purposes of the invention are attained are set forth or will appear in the following specification.

The drawing accompanying and forming part of the specification illustrates one present practical embodiment of the invention. Structure, however, may be modified to some extent, within the intent of the invention, as will be clear from the scope of the following specification and claim.

Fig. 1 in the drawing is a plan view of one of the grills;

A special feature of the invention is the use of woven wire mesh screen for the foundation or body of the grid. Use of this material has been proposed heretofore but it has not been entirely satisfactory for the reason that the wires forming the grid loosen up under repeated heating and cooling, handling and washing, and because of the fact that such screening provides multitudinous sharp corners and crevices collecting and holding foot material, making it practically impossible to keep such a structure clean and sanitary.

Figure 1:
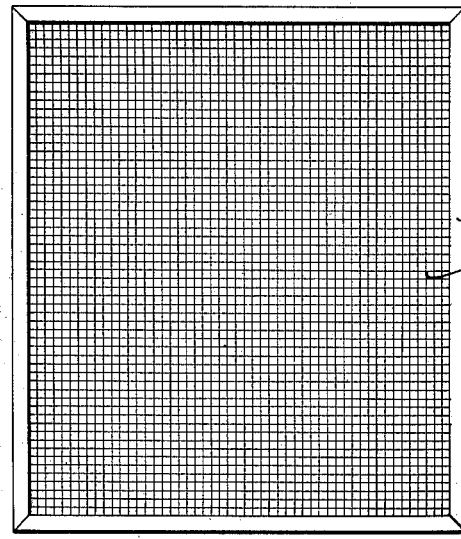
Figure 2:
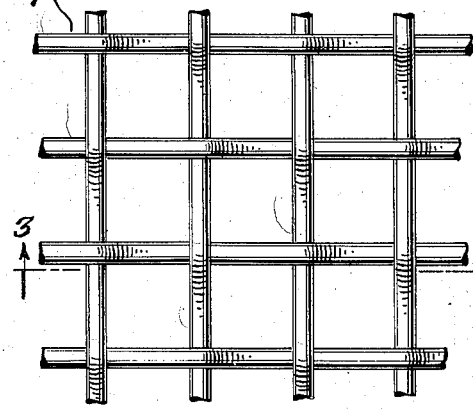
Fig. 2 is a broken plan and Fig. 3 is a broken sectional detail as on line 3—3 of Fig. 2, showing a portion of wire mesh before treatment to convert it to a grill-forming structure.
Figure 4:
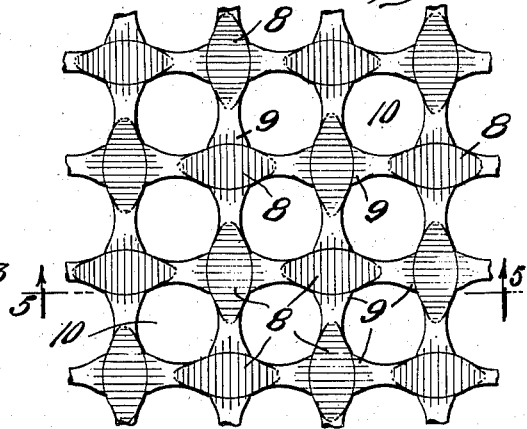
Figs. 4 and 5 are corresponding partial plan and sectional views similar to Figs. 2 and 3, showing the structure after calendering, flattening and smoothing to convert to the grill formation.
Figure 3:
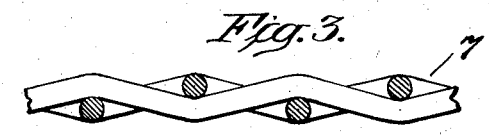
Figure 5:

The foregoing and other objections are eliminated in the present invention by taking a woven wire mesh screen such as shown at 7 in Figs. 2 and 3, and heavily calendering the same as shown in Figs. 4 and 5 to reduce the whole to a substantially uniform thickness with the over and under crossing wires flattened at the points of crossing to form more or less oval pads 8, 9, sunk substantially half way one into the other and binding and interlocking the wires together in tight, permanent, rigidly connected relation.

The flat, oval shaped pads 8 and 9 at the surface of the grill which is uppermost form four tables or supports about the four corners of each mesh in the screen, providing ample support for frail or soft foods while leaving maximum open, clear space 10 between the wires.

The calendering between pressure rolls rubs and smoothes the opposite faces while reducing the overall thickness of the screen. The final thickness may be approximately equal to the diameter of the wire so that the finished product will comprise the flat faced overlapped corner pads 8 and 9 connected by short sections of round wire. This forms a particularly firm, strong structure unaffected by the heat from cooking operations and well able to stand any cleaning and scraping that may be required.

Figure 6:
Fig. 6 is an edge view showing how the finished grill is so smooth that a sharp edged spatula may be used to lift food material thereon.

The flat, smooth faces provided by the calendering permits use of a spatula, knife or other sharp edged implement to slide under and pick up the food material, as indicated in Fig. 6.

The grills can be made up in any desired sizes. A more or less average size might be considered about 17 x 15 inches, and for such a size it has been found practicable to use a woven wire screen of 4 mesh to the inch, 18 gauge carbon steel wire. For some purposes stainless steel may be preferred.

The edges of the flattened screen may be secured and protected by a suitable binding such as the strip or strips 11 folded over the edges and made fast as by welding, brazing or the like.

What is claimed is:

A broiler grill comprising a heavily calendered, fine mesh, woven wire screen of substantially the same thickness throughout, that is, approximately equal to the diameter of the wire and substantially flat and smooth on both sides and composed of wires crossed at right angles and laterally spread at the points of crossing at both faces of the grill in flat ovoidal pads disposed at right angles to each other at the opposite faces of the grill at such points of crossing and forming smooth, flat, extended food supporting surfaces of materially greater extent than the diameter of the wire to support soft food and form smooth, sliding surfaces for any sharp edged implement used in lifting the food from the grill.

IRVING K. BENNETT.

REFERENCES CITED

The following references are of record in the file of this patent:

UNITED STATES PATENTS

| Number | Name | Date |
|---|---|---|
| 646,131 | Sheppard | Mar. 27, 1900 |
| 1,772,699 | Baumann | Aug. 12, 1930 |
| 2,097,793 | Howell | Nov. 2, 1937 |
| 2,180,486 | Tench | Nov. 21, 1939 |

FOREIGN PATENTS

| Number | Country | Date |
|---|---|---|
| 671,995 | Germany | Feb. 18, 1939 |